(12) United States Patent
Kralik et al.

(10) Patent No.: US 7,462,311 B2
(45) Date of Patent: Dec. 9, 2008

(54) PROCESS FOR PRODUCING A COMPOUND MOTOR VEHICLE COMPONENT

(75) Inventors: Martin Kralik, Weilheim (DE); Christoph Tobias Lante, Aschering (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 735 days.

(21) Appl. No.: 10/617,771

(22) Filed: Jul. 14, 2003

(65) Prior Publication Data

US 2005/0001347 A1 Jan. 6, 2005

Related U.S. Application Data

(62) Division of application No. 09/901,452, filed on Jul. 10, 2001, now abandoned.

(30) Foreign Application Priority Data

Jul. 10, 2000 (DE) .................. 100 33 232

(51) Int. Cl.
*B29C 70/68* (2006.01)
(52) U.S. Cl. .............. 264/136; 264/257; 264/163; 264/275; 264/135
(58) Field of Classification Search .......... None
See application file for complete search history.

(56) References Cited

U.S. PATENT DOCUMENTS

| | | | | |
|---|---|---|---|---|
| 2,744,042 A | * | 5/1956 | Pace | 264/46.5 |
| 3,320,108 A | * | 5/1967 | Lande | 156/219 |
| 3,782,856 A | * | 1/1974 | Salkind et al. | 416/226 |
| 3,873,654 A | * | 3/1975 | Smith | 264/258 |
| 3,923,421 A | * | 12/1975 | Carter et al. | 416/224 |
| 4,377,609 A | * | 3/1983 | Bartoli et al. | 428/71 |
| 4,557,961 A | * | 12/1985 | Gorges | 428/117 |
| 4,687,691 A | * | 8/1987 | Kay | 428/73 |
| 4,812,186 A | * | 3/1989 | McConnell et al. | 156/90 |
| 5,002,333 A | | 3/1991 | Kenmochi et al. | |
| 5,042,395 A | | 8/1991 | Wackerle et al. | |
| 5,082,609 A | * | 1/1992 | Rohrlach et al. | 264/46.4 |
| 5,238,725 A | * | 8/1993 | Effing et al. | 428/116 |
| 5,354,195 A | * | 10/1994 | Dublinski et al. | 425/504 |
| 5,401,456 A | * | 3/1995 | Alesi et al. | 264/511 |

(Continued)

FOREIGN PATENT DOCUMENTS

DE 198 47 804 5/2000

(Continued)

*Primary Examiner*—Edmund H. Le
(74) *Attorney, Agent, or Firm*—David S. Safran

(57) ABSTRACT

A process and a molding tool for making a motor vehicle roof part with a preformed plastic outside skin by deep drawing and at least one other layer which is connected to the outside skin by an adhesive. A spacer part with a large volume and low weight is placed between the inside of the outside skin and a glass fiber mat which is used as another layer and is spaced apart from it. A liquid or foam adhesive is applied in the mold tool between the inside of the outside skin or the inside of the glass fiber mat and diffuses into the spacer part. A very light and still very stable motor vehicle roof part with high production precision and surface quality results that has a plastic outside skin which, preferably, has already been colored according to the motor vehicle color.

10 Claims, 3 Drawing Sheets

U.S. PATENT DOCUMENTS

| | | | |
|---|---|---|---|
| 5,430,937 A * | 7/1995 | Leahy et al. | 29/889.5 |
| 5,433,151 A | 7/1995 | Ohara et al. | |
| 5,580,502 A * | 12/1996 | Forster et al. | 264/46.5 |
| 5,725,712 A | 3/1998 | Spain et al. | |
| 5,914,175 A | 6/1999 | Nudo et al. | |
| 6,008,149 A * | 12/1999 | Copperwheat | 442/381 |
| 6,227,840 B1 | 5/2001 | Keller et al. | |
| 6,375,249 B1 | 4/2002 | Stanton et al. | |
| 6,406,588 B1 * | 6/2002 | Sheetz et al. | 156/309.3 |
| 6,618,944 B1 * | 9/2003 | Persson et al. | 29/897 |
| 6,776,865 B1 * | 8/2004 | Yamaguchi et al. | 156/245 |
| 6,832,810 B2 * | 12/2004 | Byma et al. | 296/214 |

FOREIGN PATENT DOCUMENTS

| | | |
|---|---|---|
| EP | 0 214 138 | 3/1987 |
| EP | 0 825 066 | 2/1998 |
| FR | 1 113 551 | 3/1956 |
| FR | 2 576 862 | 8/1986 |
| WO | WO 99/16657 | 4/1999 |

\* cited by examiner

PROCESS FOR PRODUCING A COMPOUND MOTOR VEHICLE COMPONENT

CROSS REFERENCE TO RELATED APPLICATION

This application is a division of U.S. patent application Ser. No. 09/901,452 filed Jul. 10, 2001, now abandoned.

BACKGROUND OF THE INVENTION

1. Field of the invention

The invention relates to a compound motor vehicle component, especially a motor vehicle roof part, with an outside skin, an inside layer and a spacer part which contains hollow chambers, and which is located between the outside skin and the inside layer and is connected to them. The invention furthermore relates to a process for producing one such compound motor vehicle component and a molding tool for producing one such compound motor vehicle component.

2. Description of related art

French Patent 1,113,551 discloses a roof part for a motor vehicle is produced by joining two layers with an interposed spacer part containing hollow cavities under the action of heat radiation or infrared radiation and compression in a molding tool to form a sandwich component. First, a release agent is applied to the molding tool, and then, an outside layer of a thermosetting resin is applied to the release agent. A layer of resin-impregnated glass fiber fabric is applied to this outside layer. Then, the honeycomb spacer part is applied, due to its flexibility, it adapts to the shape dictated by the molding tool. Finally, another layer of resin-impregnated glass fiber fabric completes the roof part which is set by the action of heat.

SUMMARY OF THE INVENTION

A primary object of this invention is to create an easy-to-produce compound motor vehicle component of stable shape with very high surface quality, and to create a process and a device for producing the compound motor vehicle component.

This object is achieved by a compound motor vehicle component in which the final, outer side of the compound component is formed by using a surface-finished component as the outside skin which is connected to the spacer part. Accordingly, the outside skin can be sheet metal which has been enameled in the desired color or a colored plastic.

In particular, by pre-forming the outside skin, preferably by deep drawing, a very light, but still stable compound motor vehicle component is formed, especially a motor vehicle roof part, with an outside skin which can be produced in high precision and surface quality.

Advantageously, a spacer part, as known from FR-A-1 113 551, which has webs which separate the hollow chambers and which extend essentially perpendicularly to the outside skin is used. In this way, an especially high stability of shape is achieved perpendicular to the direction of primary extension or in the vertical direction. Furthermore, the spacer part, advantageously, has a permeability to the liquid or foam adhesive due to the hollow chambers. By diffusing the adhesive into the glass fiber mats and towards the side walls of the webs, a very high inherent stability results and is at least equivalent to that of a sheet metal part. Heat treatment which may adversely affect the quality of the outside skin and which is required in the roof part described in FR-A-1 113 551 is not necessary for setting of the liquid or foam adhesive.

By using a film, especially a thermoplastic film which can be deformed by deep drawing, almost any shape can be produced for a compound motor vehicle component in the corresponding molding tools. The thermoplastic film is preferably composed of a carrier layer which is formed, for example from ASA-PC (acrylonitrile-styrene acrylester polycarbonate) or from ASA-HDT (ASA with high thermal stability), an appearance layer of colored PMMA (polymethyl methacrylate) which adjoins it to the outside, and optionally, a protective layer of transparent PMMA which follows further to the outside.

At least one additional layer which is formed by a glass fiber mat is preferably added to the outside skin and the spacer part. Here, a glass fiber mat is located on the side of the spacer part facing away from the outside skin. It is likewise joined to the spacer part by an adhesive which has been sprayed on.

Optionally, to further stiffen the compound motor vehicle component, there is another glass fiber mat between the outside skin and the spacer part or reinforcing fibres with random orientation. The glass fiber mats preferably have a weight per unit of area of 300 to 400 grams per square meter and a thickness of roughly 0.3 millimeters.

The adhesive is preferably polyurethane. It is used essentially to guarantee the connection between the inside layer and the spacer part or between the outside skin and the spacer part and its strength.

The spacer part preferably contains a structure in honeycomb or corrugated shapes of cardboard, aluminum and plastic, for example, of polyamide or polyester.

The outside skin overall has a thickness of for example 1-2 mm and preferably roughly 1.5 mm.

A process in accordance with the invention for producing a compound motor vehicle component contains the following process steps:

insertion of an outside skin, which acts as a carrier layer during the production process, into a first mold half of a mold;

insertion of a glass fiber mat into the second mold half;

application of an adhesive to the glass fiber mat in the second mold half and to the back side or inside of the outside skin in a first mold half or to the glass fiber mats on the bottom and/or top of the spacer part which is provided with hollow chambers;

insertion of the spacer part between the two mold halves while the adhesive layers are still liquid or sticky;

closing of the two mold halves with impression of the final shape;

the first mold half can be a first mold half and the second mold half can be the second mold half; and diffusion of the adhesive into the spacer part and setting of the adhesive.

To further increase stability, preferably the spacer part is provided with another glass fiber mat before placement on its surface which faces the inside of the outside skin.

Adhesive can be applied, preferably by means of a spray or foaming tool which is guided by a robot, to the glass fiber mat in the second half of the mold and to the inside of the outside skin directly in the tool when the tool halves are still opened. Alternatively, it is also possible to also apply the adhesive outside the tool at least relative to the upper glass fiber mat. As another alternative, it is also possible for the adhesive to be sprayed or foamed outside the tool onto the top and bottom of the spacer part and for it to be inserted between the upper glass fiber mat which is already in the tool halves and the outside skin. Finally, as another alternative, prefixed glass fiber mats can be located on the top and bottom of the spacer part and sprayed or foamed in outside the molding tool with adhesive. The sprayed-in or foamed-in spacer part is then inserted between the tool halves and connected to the outside skin.

As another process step, by means of a slider located in the tool, after setting, the edge area of the motor vehicle roof part which is used to hold the outside skin and the glass fiber mat is cut away.

One mold tool which is especially suitable for producing the compound motor vehicle component, according to the invention, is formed by the first for example first half of the molding tool which is preformed to hold the outside skin of the compound motor vehicle component which is used as the carrier layer in the production process and has a slider which can be moved perpendicular to the direction of extension of the compound motor vehicle component and which is provided with centering pins for holding the outside skin and with an edging cutter, and by the second half of the molding tool which is provided with holding devices and/or projections to hold a glass fiber mat.

In another embodiment, the second half of the molding tool has a slider which is provided with a groove for holding the centering pins and which has an opposite surface which yields upward opposite the edging cutter of the first mold tool half.

Optionally, an additional spray or foaming tool for applying the adhesive between the opened mold halves is supported to be insertable on the frame of the molding tool. This spray tool is preferably guided by a robot arm. It has two sets of nozzles, of which one nozzle set is pointed up and the other nozzle set is pointed down.

Embodiments of the invention are described below in greater detail with reference to the accompanying drawings.

DETAILED DESCRIPTION OF THE INVENTION

Figure 1:
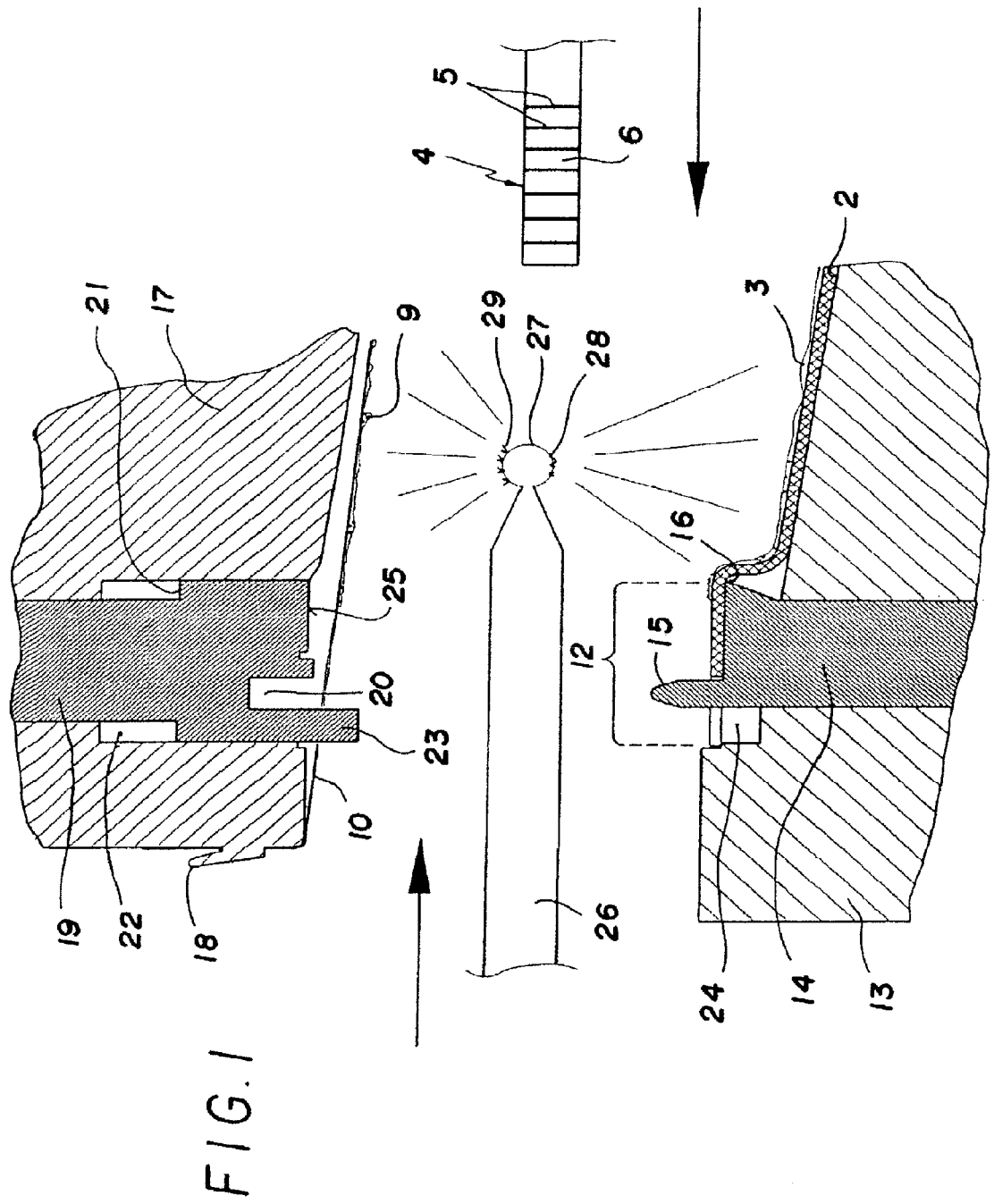
FIG. 1 shows a section through the edge area of a molding tool in the production of a first compound motor vehicle component, especially a motor vehicle roof part, in the opened state.
Figure 2:
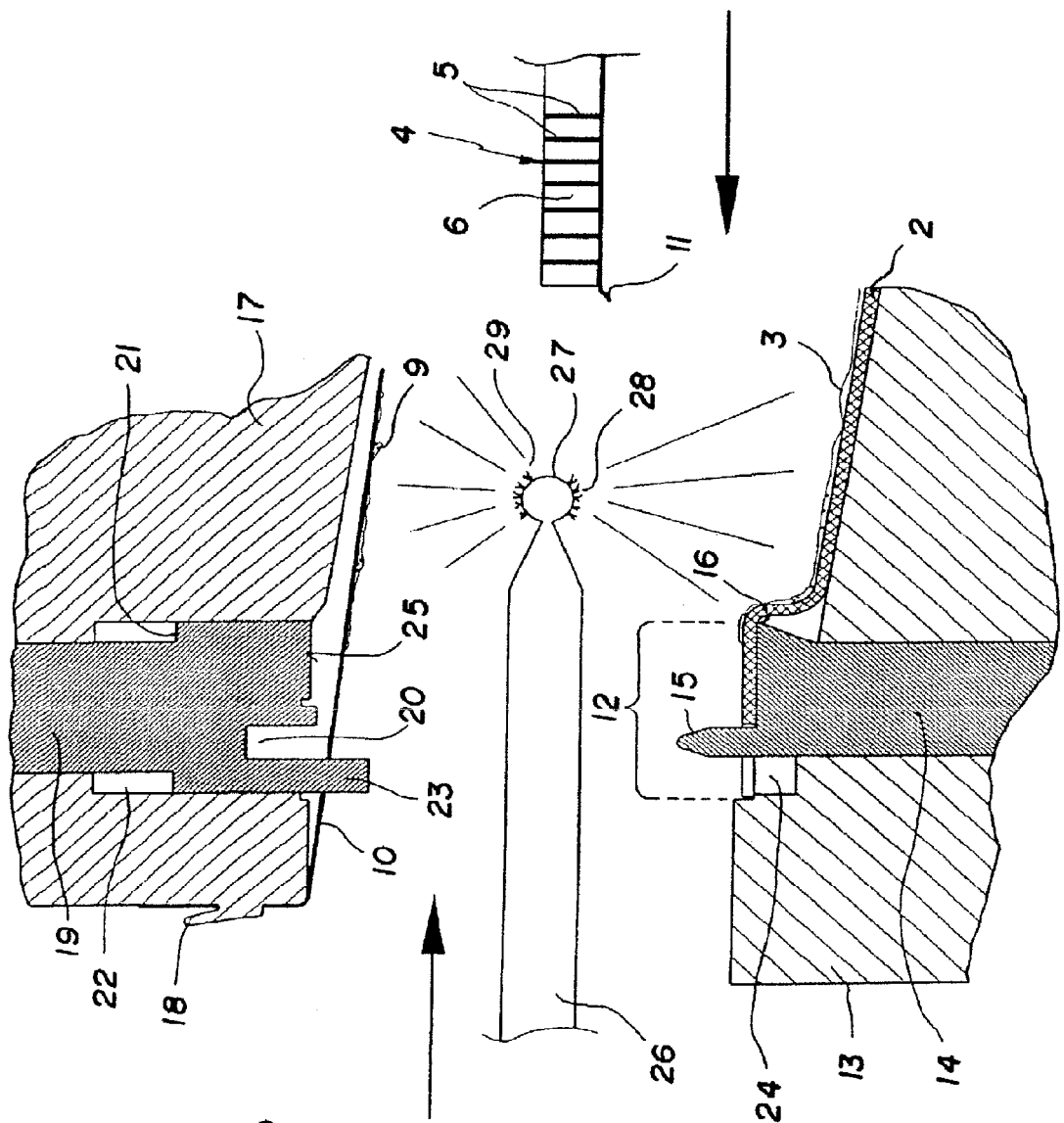
FIG. 2 shows a section through the edge area of a molding tool in the production of a second compound motor vehicle component in the opened state.
Figure 3:
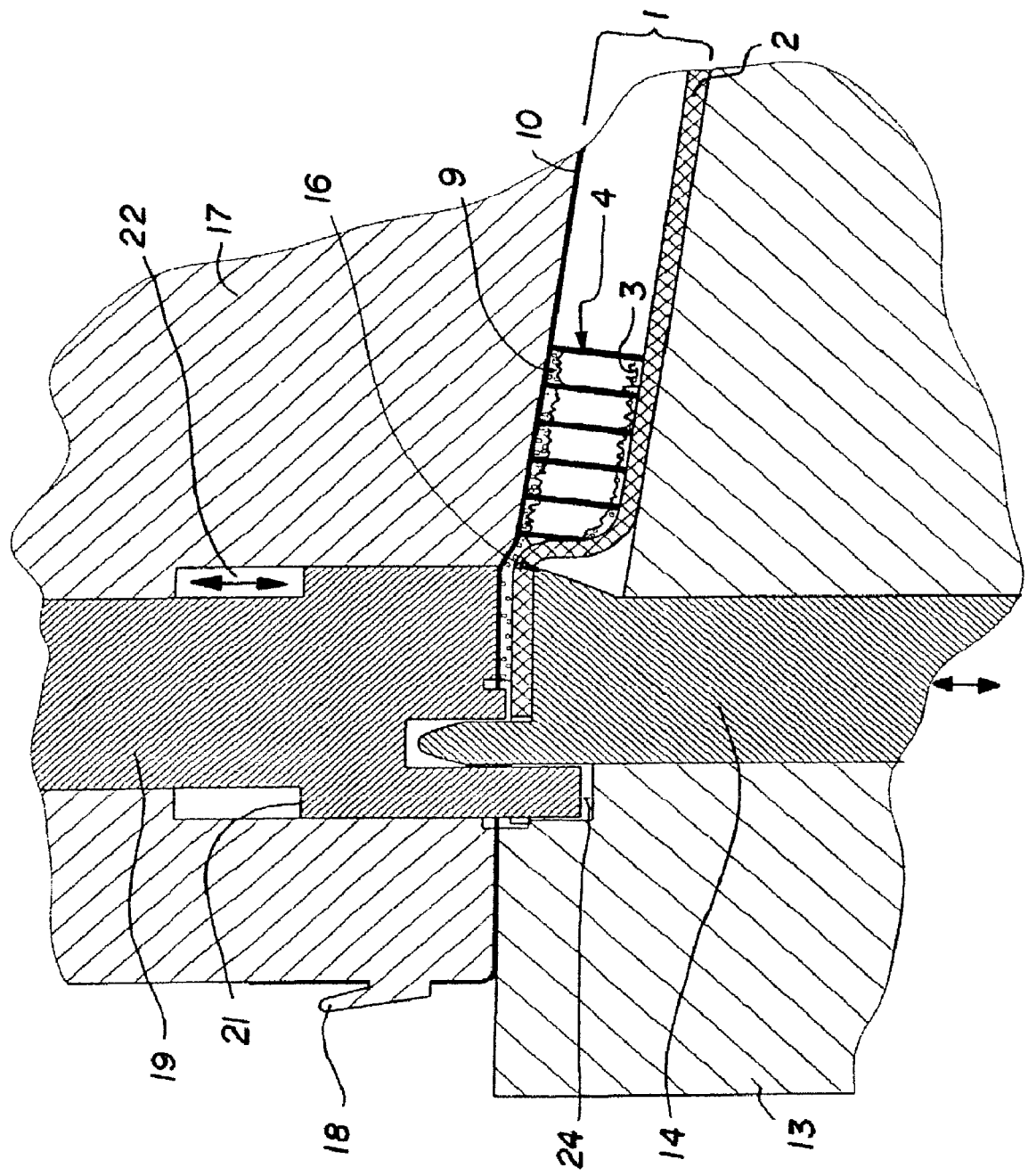
FIG. 3 shows a section through the edge area of a molding tool in the closed state.

A motor vehicle roof part 1, which is prefabricated for cementing into a motor vehicle roof and which has an edge area which is shown in cross section in FIG. 3 in its complete structure, is composed of an outside skin 2 which is used in the production process as a carrier layer, an adhesive layer 3 which is applied to its inside by spraying or foaming on (see, FIG. 1 or 2), a spacer part 4, an adhesive layer 9 and an upper glass fiber mat 10.

In the embodiment shown in FIG. 2, there is also a lower glass fiber mat 11, which in the embodiment, is located on the bottom of the spacer part 4. If herein, with reference to the motor vehicle roof part 1, "lower" and "upper" are used, this location indication relates to the positions shown in FIGS. 1 to 3 in the production process, while the installation position of the motor vehicle roof part 1 in the motor vehicle, for example, represents a position turned by 180°.

The spacer part 4 is composed of a honeycomb structural part of cardboard, aluminum or plastic with vertical webs 5 and hollow chambers 6 which are located in between. The structural part can also be formed from corrugated layers, the corrugations forming the webs 5. Since thin-walled material is used for the webs 5, the spacer part 4 is very light. The hollow chambers 6 have openings or pores on their top and bottom which are permeable to the adhesive 3, 9 and which enable the adhesive to diffuse into the area of the webs 5.

The molding tool which is used for production is composed of a bottom tool half 13 with a slider 14 which can be moved perpendicular to the direction of extension of the outside skin 2, and a top tool half 17 with a slider 19 which likewise can be moved perpendicular to the direction of extension of the outside skin 2.

On the slider 14 of the bottom tool half 13, there are several centering pins 15 which are spaced apart from one another and which are used to hold the outside skin 2 which has been inserted into the bottom tool half 13. The outside skin 2 can be formed into a shape which is specific to the respective motor vehicle roof part or it is formed into its final shape in the molding tool.

On the top tool half 17, there are several holding devices 18 on the outside which are spaced apart from one another and which, in conjunction with the projections 23 which are provided on the slider 19, are used to hold and center the top glass fiber mat 9. Furthermore, the projections 23 are used in conjunction with a groove 20 which is located inwardly therefrom to center and hold the centering pins 15 when the tool halves 13, 17 close. Still further inward from the groove 20, on the top slider 19, there is an opposite surface 25 which adjoins the edge area 12 of the outside skin 2 in the closed state of the tool (see, FIGS. 1 & 2). The inner edge of the surface 25 on the slider 19 is opposite the edging cutter 16 which is provided on the inside edge of the slider 14. The bottom tool half 13 has a receiving space 24 for the projections 23 of the top tool 19 when viewed from the centering pins 15 toward the outside.

The upper slider 19 is movably guided in the guide chamber 22 of the upper tool 17. The stop surface 21, which is provided on the back of a widened head of the slider 19, limits the motion of the slider 10 in conjunction with the bottom of the guide chamber 22.

After inserting the outside skin 2 into the bottom tool half 13 and the upper glass fiber mat 10 into the top tool half 17, by means of a spray tool 26 which has been inserted between the opened tool halves and which has a spray head 27 with a set of nozzles, 28 which are pointed downward and a set of nozzles 29 which are pointed upward, adhesive 3 is sprayed onto the inside of the outside skin 2 and adhesive 9 is sprayed or foamed onto the bottom of the upper glass fiber mat 0. Preferably, polyurethane or polyurethane foam is used as the adhesive 9. It has a setting time of roughly 30 seconds. As long as the polyurethane or polyurethane foam is still liquid, the spacer part 4 is inserted between the opened tool halves 13, 17 and placed on the inside of the outside skin 2, which inside is arched in the manner of a trough and is bounded by the edge area 12 which is bent at right angles to the top.

Alternatively to the application of the adhesive 3, 9 in the tool, it is likewise possible to apply the adhesive to the inside of the upper glass fiber mat 10 and/or to the inside of the outside skin 2 outside of the tool, then insert it/them into the tool, and then, insert the spacer part 4. As another alternative the spacer part 4 can also be sprayed with adhesive 3, 9 on its top and bottom outside of the tool, and then placed on the inside of the outside skin 2 in the lower tool half 13.

According to another alternative, the spacer part 4 can be provided with a glass fiber mat on its top and/or bottom which has been fixed there beforehand and onto which the adhesive is sprayed, and which, in the still liquid state of the adhesive, can be placed in the opened molding tool halves.

When the tool is closed, first the bottom tool half 13 and the top tool half 17 are moved towards one another. In doing so, the centering pins 15 are held by the groove 20 and the projections 23 are held by the receiving space 24. The outside area 12 of the outer skin 2 is pressed securely against the opposite surface 25 by the slider 14. In this state, with the tool closed (FIG. 3), the still liquid adhesive 3 diffuses into the cavities of the spacer part 4 and connects the connecting areas of the webs 5 to the glass fiber mat 10, 11 there, as shown in FIG. 3. In this way, the spacer part 4 achieves very high inherent stability with very low weight at the same time. The adhesive 3, 9 is also applied to the inside part of the edge area 12, in the region of the edge of the outside skin 2 which has been bent at right angles, so that the outside skin 2 is joined peripherally to the top glass fiber mat 10 in this area in a watertight manner.

After setting of the adhesive 3, 9, in another step, the lower slider 14 and the upper slider 19 are moved inward toward each other, the edging cutter 16 cutting off the edge area 12. The finished motor vehicle roof part can now be removed from the lower tool half 13 after the tool halves 13, 17 are moved apart. Since the completely prefabricated outside skin 2 is made of thermoplastic next to a carrier layer of polycarbonate, an appearance layer of PMMA which has been colored in the color of the motor vehicle which follows to the outside, optionally, with the addition of a protective layer of transparent PMMA applied to the outside of the appearance layer, the motor vehicle roof part is already in the ready-to-use state and can be inserted into the motor vehicle by cementing, for example, after delivery at the motor vehicle manufacturer to the installation line.

Since the outer skin 2 has a thickness of only roughly 1.5 mm, the spacer part 4 is formed of very light, thin-walled material and also the glass fiber mats 10, 11 and the adhesive layers 3, 9 have a very low weight, the finished motor vehicle part 1 is very light with high stability. In this way, the center of gravity of the motor vehicle can be kept very low.

The compound motor vehicle part can also be formed as a trunk lid or as another flat motor vehicle part.

What is claimed is:

1. Process for producing a compound motor vehicle component with an outside skin formed of a finished surface component, an inside layer and a spacer part, the spacer part being a honeycomb structural part which contains hollow chambers that have open ends at sides thereof facing the finished surface component, and a glass fiber mat and which is located between the outside skin and the inside layer and is connected to them, comprising the steps of:
    inserting the finished surface component into a first half of a molding tool,
    inserting the glass fiber mat into a second half of the molding tool,
    applying a liquid adhesive layer to the glass fiber mat in second mold half and to the surface-finished component in a first mold half,
    inserting the spacer part between the adhesive layers while the adhesive layers are still liquid, and
    closing the a first and second mold halves so as to press the compound motor vehicle component into its final shape and so as to diffuse the adhesive into the open ends of the hollow chambers of the spacer part, and
    setting the adhesive.

2. Process as claimed in claim 1, wherein the a preshaped, deep drawn component is provided as the finished surface component.

3. Process as claimed in claim 1, wherein a second glass fiber mat is provided on the spacer part before inserting the spacer part into the molding tool, and wherein the spacer part is inserted in the mold half with the second glass fiber mat facing an inner side of the finished surface component.

4. Process for producing a compound motor vehicle component with an outside skin formed of a finished surface component, an inside layer and a spacer part, the spacer part being a honeycomb structural part which contains hollow chambers that have open ends at sides thereof facing the finished surface component, and a glass fiber mat and which is located between the outside skin and the inside layer and is connected to them, comprising the steps of:
    inserting the finished surface component into a first half of a molding tool,
    applying a liquid adhesive layer to the glass fiber mat and to the surface-finished component,
    inserting the spacer part onto the adhesive layer of finished surface component and
    inserting the glass fiber mat into a second half of the molding tool,
    closing the first and second mold halves, while the adhesive layers are still liquid, so as to press the compound motor vehicle component into its final shape and so as to diffuse the adhesive into the open ends of the hollow chambers of the spacer part, and
    setting the adhesive,
    wherein the adhesive is applied at least to the glass fiber mat outside of the tool, and the glass fiber mat to which the adhesive has been applied is placed horizontally in the tool on the top of the spacer part.

5. Process as claimed in claim 1, wherein after setting of the adhesive, a peripheral area of the glass fiber mat of the compound motor vehicle component is cut away by punching via a movable slider which is located in an edge area of the tool and which is used to hold the outside skin.

6. Process as claimed in claim 1, wherein, during said closing and setting steps, an edging cutter provided in the first half of the molding tool is engaged with an opposed surface of a slider provided in the second half of the molding tool which has a groove for holding centering pins, the slider being displaced on said engagement of the edging cutter on said surface.

7. Process as claimed in claim 1, wherein said applying step comprises the step of inserting a spray tool between the halves of the molding tool for applying said adhesive layer.

8. Process as claimed in claim 7, wherein the spray tool has a spray head with two sets of nozzles on the spray head, each of said sets facing toward a respective one of the halves of the molding tool, adhesive being sprayed toward both said finished surface component and said glass fiber mat.

9. Process as claimed in claim 1, wherein the spacer is formed of one of a cardboard, metal, and polyamide or polyester plastic material.

10. Process as claimed in claim 4, wherein the spacer is formed of one of a cardboard, metal, and polyamide or polyester plastic material.

* * * * *